UNITED STATES PATENT OFFICE.

FREDERICK G. DOKKENWADEL, OF COSHOCTON, OHIO, ASSIGNOR OF ONE-HALF TO HARRY M. GRANT, OF NEW YORK, N. Y.

FERTILIZER.

No. 853,919.

Specification of Letters Patent.

Patented May 14, 1907.

Application filed December 12, 1906. Serial No. 347,515.

*To all whom it may concern:*

Be it known that I, FREDERICK G. DOKKENWADEL, a citizen of the United States, residing at Coshocton, in the county of Coshocton and State of Ohio, have invented a new and useful Fertilizer, of which the following is a specification.

My invention relates to fertilizers, and has for an especial object the provision of a fertilizing compound which comprises a base of considerable durability with which the fertilizing material proper is combined, so that when the fertilizer is put into the soil it will not too readily dissipate but will continue to be of active value for a considerable time.

The characteristics and advantages of my invention are hereinafter described in detail.

I will now describe a specific compound which embodies my invention and the process by which it is produced so that others may be able to make and use the same; but it is to be understood that the ingredients and methods of manufacture of the fertilizer are to be varied within wide limits and I do not limit myself to the specific process and ingredients herein described.

To make approximately a ton of finished fertilizer, I dissolve about 500 pounds of nitrate of soda in hot water; about 250 pounds of paper pulp is prepared conveniently in granular form and with this I mix 250 pounds approximately of fine saw-dust. If it is desired to produce the finished product in granular form, about three to five pounds of glue is added to the solution of nitrate of soda.

The paper pulp and saw-dust are mixed with the soda solution conveniently in a mixing machine which has a steam jacket attachment. During the mixing process, or when the same is completed, about a third of the water is dried out of the mass, and then about 1,000 pounds of marl is mixed in. The mixture is then treated in any suitable manner such as by rolling in a drier until all of the moisture is dried out, and during this last drying process, if desired, the material may be treated so as to form it into grains or other desired commercial shape.

If it desired to pulverize the fertilizer the glue is left out of the mixture.

From the foregoing description of the process of manufacture, it is evident that an important feature of the invention is the intimate incorporation of one of the active principles of the fertilizer—the nitrate of soda—with a base of suitable material, which resists for a considerable time the process of decay, such for example as the paper pulp and saw-dust (or both). The marl may in some cases be omitted, but if used forms an active fertilizing agent additional to the nitrate of soda and reduces the expense of the product.

When fertilizer made according to my invention is put in the ground, the relatively durable base maintains the active fertilizing agent for a considerable period where it will have the proper fertilizing effect upon the plants, and prevents such material from being quickly washed away on the surface of the ground or into the sub-soil, as is liable to occur with other fertilizers now in use. Evidently a single application of my fertilizer may outlast a number of applications of some other compound, or a certain quantity of my compound may prove more efficacious than larger quantities of fertilizers otherwise prepared.

In addition to the foregoing advantages, my fertilizer is entirely odorless and serves as an insecticide, whereas other fertilizers consisting principally of bone meal, etc., are frequently eaten by insects with obvious waste.

Instead of nitrate of soda, other suitable active fertilizing agents which are capable of being combined with the durable base in the proper manner may be used, depending on cost of materials, requirements of particular soil, etc. Examples of active fertilizing agents which may be substituted for nitrate of soda are potash, phosphoric acid, and ammonia, either singly or combined in suitable proportions.

Having described my invention, I claim:

1. A fertilizer comprising a base of paper pulp and saw-dust intimately combined with nitrate of soda and marl, substantially as described.

2. A fertilizer comprising a base of paper pulp intimately combined with nitrate of soda and marl, substantially as described.

In testimony whereof I have affixed my signature in the presence of two witnesses.

FREDERICK G. DOKKENWADEL.

Witnesses:
 CHRISTOPHER HISER,
 VELA BACON.